UNITED STATES PATENT OFFICE.

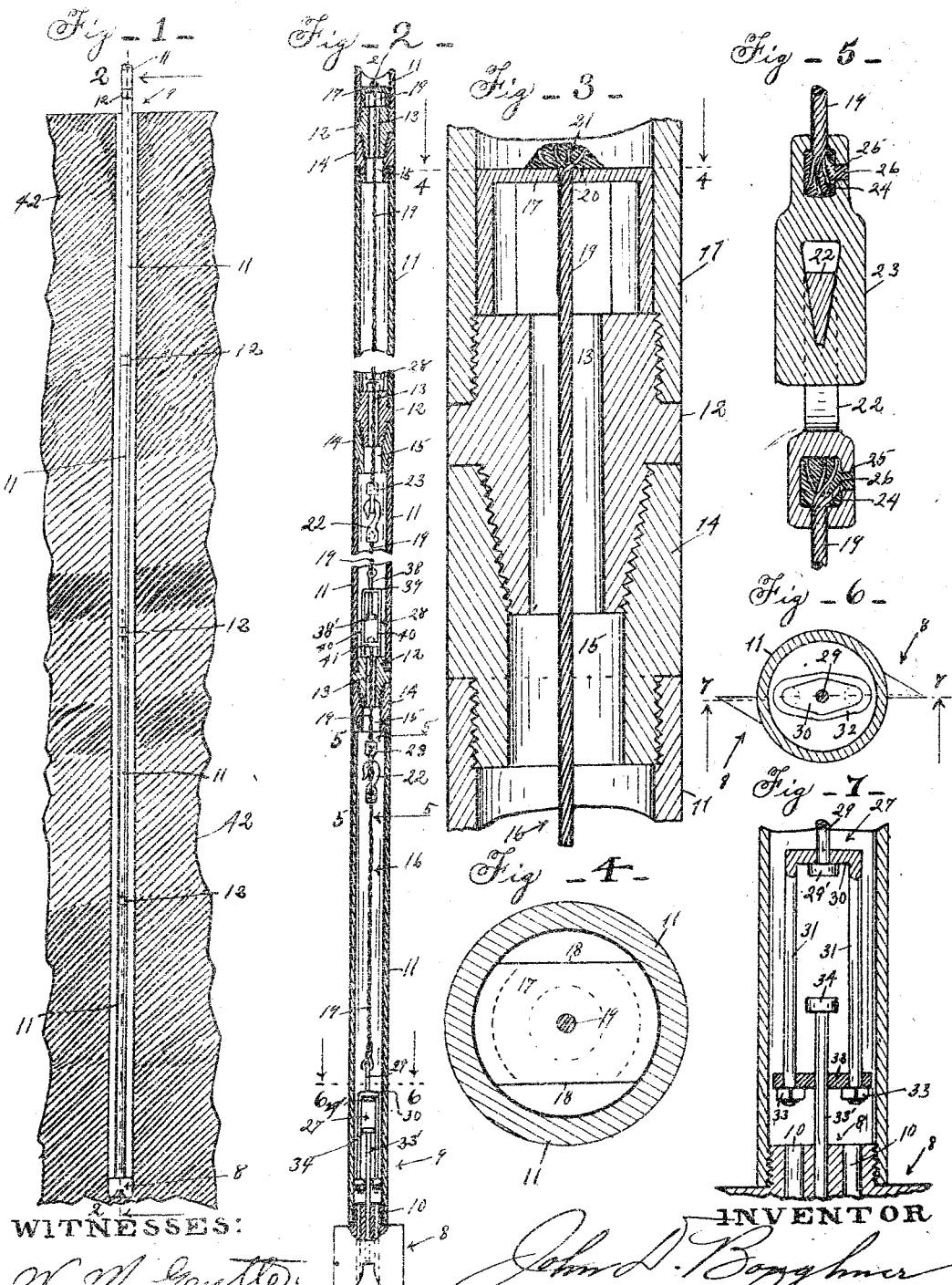

JOHN D. BOUGHNER, OF YORBA LINDA, CALIFORNIA.

DRILL-ROD CONNECTION.

1,075,896.

Specification of Letters Patent.

Patented Oct. 14, 1913.

Application filed November 29, 1912. Serial No. 734,191.

*To all whom it may concern:*

Be it known that I, JOHN D. BOUGHNER, a citizen of the United States of America, residing at Yorba Linda, in the county of Orange, State of California, have invented a certain new and useful Drill-Rod Connection; and I do hereby declare the following to be a full, clear, and exact description of the invention, such as will enable others skilled in the art to which it appertains to make and use the same.

This invention relates to means for recovering broken rotary-drill apparatus, and it may be said to consist in the provision of novel and advantageous features and in the novel and improved construction, arrangement and combination of parts and devices as will be apparent from the description and claims which follow hereinafter.

One object of the invention is to provide improved means whereby rotary-drill apparatus broken in use may be readily recovered with less of the trouble, loss of time, and expense necessary by the methods heretofore employed.

Further objects of the invention are to provide means which is simple in construction, strong and durable, economical to manufacture and use, easily applied in practice, and effective in operation.

Other objects and the advantages of the invention will be apparent to those skilled in the art from a consideration of the following description of the preferred form of construction embodying the invention, taken in connection with the accompanying drawings in which—

Figure 1 is a broken elevational view of apparatus embodying the invention, the operating means not being shown; Fig. 2 is an enlarged broken and sectional view taken on the line 2—2 in Fig. 1; Fig. 3 is an enlarged view of the upper part of the structure shown in Fig. 2; Fig. 4 is a transverse view taken on the line 4—4 of Fig. 3; Fig. 5 is an enlarged broken and sectional view taken adjacent to the arrows 5—5, Fig. 2; Fig. 6 is an enlarged transverse view taken on the line 6—6 of Fig. 2; and Fig. 7 is an enlarged broken and sectional view taken on the line 7—7 of Fig. 6.

The boring device 8, of any suitable or approved construction, has thereon the hollow stem 9 and may be provided with openings 10 therethrough in communication with the interior of the hollow stem to permit the passage of water therethrough to facilitate drilling operations. The hollow stem 9 is made up of sections 11 which may be joined together by any suitable or approved means, that shown consisting of the tapering pin 12 having an opening 13 therethrough and which is secured to one of the sections and is adapted to be threaded into a socket 14 which has an opening 15 therethrough and is secured to another of the sections.

The means 16 which is arranged in the interior of the hollow stem 9, and which ties together the upper part and the lower part of the apparatus to permit quick recovery of the apparatus when it is broken will now be described.

In the upper part of the apparatus is arranged to rest on the top of one of the pins 12 a crosspiece 17 which has the sides 18 thereof cut away to avoid stopping the flow of water through the hollow stem 9 and to which is suitably secured the cable 19. As shown, the cable 19 may be secured to the crosspiece 17 by being passed through the crosspiece and having the strands 21 thereof spread apart and babbitt, solder or the like 24 applied thereto on the top of the crosspiece.

The cable 19 is preferably made up of sections having secured thereon hooks 22 and eyes 23 whereby adjacent of the sections may be joined or disjoined by passing the hand through the openings 15 and manipulating the hooks 22 and eyes 23 when the sections 11 of the hollow stem 9 are being joined or disjoined. The sections of the cable 19 may be secured to the hooks 22 and eyes 23 by providing the hooks and eyes with cavities 24 into which the end portion of the sections of cable may be passed and spread apart and embedded in suitable babbitt, solder or the like 26 forced into the cavities through openings 25.

To avoid torsional strain on and permit free turning of the cable 19, a swivel connection 27 is provided between it and the boring device 8. Also in order to assist in sustaining the weight of the cable 19 the latter may be secured to the swivel 28 the lower end portion of which rests on one of the pins 12. The swivel 27 is preferably made expansible and may consist of the bolt 29 which has on its lower end a head 29' and passes freely through the crosspiece 30 at the top of spaced parallel rods 31, and as suitably secured on its upper end the cable 19. A crosspiece 32 is secured in position at the lower end of the rods 31 by means of nuts 33, and through the crosspiece 32 passes freely the rod 33′ having at the upper end thereof the head 34 normally disposed at a distance above the crosspiece 32 and having its lower end passing into and suitably secured to the boring device 8. The swivel 28 is also preferably made expansible and may consist of bolt 38 which has the upper end thereof suitably secured to cable 19 and has on its lower end the head 38′ and passes freely downwardly through the crosspiece 39 at the top of spaced parallel rods 40 which rest on the top of one of the pins 12 and have on the lower end portion thereof a crosspiece 41 to which the cable 19 is suitably secured.

From the foregoing description and by referring to the drawings it will be understood that should the hollow stem 9 break in use, the apparatus may be easily and quickly raised out of the ground 42 and the means 16 permits of expeditious recovery of the part of the apparatus below the break.

While one form of construction embodying the invention has been particularly illustrated and described, there are many changes and modifications thereof that will readily occur to those skilled in the art, wherefore the right is reserved to all such changes and modifications as do not depart from the spirit and scope of the invention as defined in the appended claims.

I claim:

1. The combination of rotary-drill apparatus including a boring device and a hollow stem thereon, a crosspiece arranged in the upper part of the stem, and a cable connection, including a swivel, between the crosspiece and the boring device, substantially as set forth.

2. The combination of rotary-drill apparatus including a boring device and a hollow stem thereon, a crosspiece arranged in the upper part of the hollow stem, a cable connection, including a swivel, between the crosspiece and the boring device, and means below the crosspiece to assist in sustaining the weight of the cable, substantially as described.

3. The combination of a rotary-drill apparatus including a boring device and a hollow stem thereon, a crosspiece arranged in the upper part of the hollow stem, a cable connected to the crosspiece, hooks and eyes for joining sections of the cable, and an expansible swivel connection between the cable and the boring device.

4. The combination of a rotary-drill apparatus including a boring device and a hollow stem thereon, a crosspiece in the hollow stem, a cable connected to the crosspiece, and an expansible swivel connection between the cable and the boring device, substantially as set forth.

In testimony whereof, I have signed my name to this specification in the presence of two subscribing witnesses at Los Angeles, county of Los Angeles, State of California, this 23rd day of November A. D. 1912.

JOHN D. BOUGHNER.

Witnesses:
 ANNA B. DESSAU,
 A. H. LIDDERS.